US006805265B1

United States Patent
Goldman et al.

(10) Patent No.: US 6,805,265 B1
(45) Date of Patent: Oct. 19, 2004

(54) MEASURING DISPENSING TOP FOR AN AQUARIUM FISH FOOD CONTAINER

(75) Inventors: Ricky Scott Goldman, Cold Spring Harbor, NY (US); Gerald A. Phillips, Wantagh, NY (US)

(73) Assignee: Penn-Plax, Inc., Garden City, NY (US)

( * ) Notice: Subject to any disclaimer, the term of this patent is extended or adjusted under 35 U.S.C. 154(b) by 0 days.

(21) Appl. No.: 10/443,618

(22) Filed: May 23, 2003

(51) Int. Cl.[7] .............................................. G01F 11/26
(52) U.S. Cl. ...................... 222/451; 222/441; 222/454
(58) Field of Search ............................. 222/424.5, 441, 222/448, 450, 451, 454, 456, 158

(56) References Cited

U.S. PATENT DOCUMENTS

| | | | | |
|---|---|---|---|---|
| 4,201,320 A | * | 5/1980 | Eppenbach | 222/456 |
| 4,346,823 A | * | 8/1982 | Eppenbach | 222/443 |
| 5,259,533 A | * | 11/1993 | Kornfein et al. | 222/170 |
| 5,772,086 A | * | 6/1998 | Krafft | 222/438 |
| 5,894,965 A | * | 4/1999 | Robbins, III et al. | 222/444 |

* cited by examiner

Primary Examiner—J. Casimer Jacyna
(74) Attorney, Agent, or Firm—Kubovcik & Kubovcik

(57) ABSTRACT

A measuring dispensing top for an aquarium fish food container which includes a base, a flip top pivotably mounted in a side wall provided on the base and movable between a closed position which closes the container and an open position which opens the container into the top; and a cover slidable in the side wall between a closing position which covers and defines a measuring chamber and allows the flip top to be moved to its open position which opens the container into the measuring chamber and enables a measured amount of fish food to be dispensed therein, and a second opening position which locks the flip top in its closed position and opens the measuring chamber for dispensing the container contents into an aquarium.

3 Claims, 4 Drawing Sheets

Fig. 1
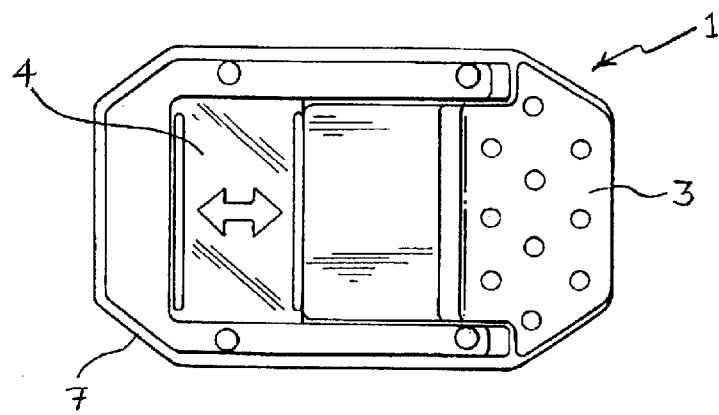
Fig. 2
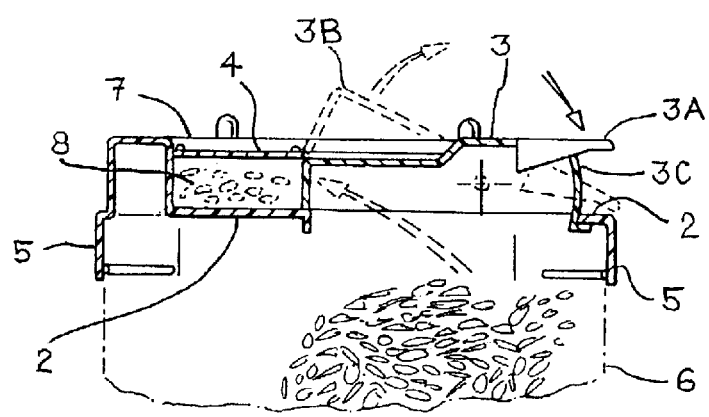
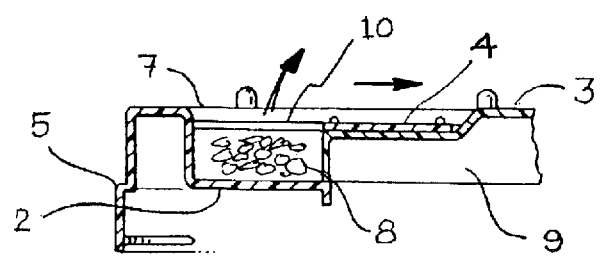
Fig. 3

MEASURING DISPENSING TOP FOR AN AQUARIUM FISH FOOD CONTAINER

FIELD OF THE INVENTION

This invention relates to a dispensing top for a container and, more specifically, to a dispensing top which enables measured amounts of fish food to be dispensed from the container.

BACKGROUND OF THE INVENTION

Food for aquarium fish is typically dispensed directly into an aquarium tank because people do not like to touch fish food with their fingers since it can contaminate the food or leave residue on their hands. However, pouring food directly out of the container into the aquarium tank does not work well since it is impossible to correctly control the amount of food going into the tank. Controlling the amount of food is critical for proper maintenance of the fish.

Various dispensing means for an aquarium fish food container have been proposed which allow a fixed amount of food to be taken out of the container without touching the food. For example, U.S. Pat. No. 5,657,802, discloses a one touch opening plug which includes a detachable spoon. Although the plug disclosed in this patent allows food to be taken out of the container and measured without touching the food, dispensing of the food into a detached spoon does not allow for precise measuring of the amount of food and is not convenient.

U.S. Pat. No. 5,894,965 discloses a measuring dispensing cap with a spring biased flip top which enables accurately measured amounts of granular or particulate container contents to be dispensed from the cap. Although such measuring dispensing cap could theoretically be used to dispense fish food from an aquarium fish food container, the cap has a relatively complex structure and is not useful from a practical standpoint.

OBJECT OF THE INVENTION

It is an object of the present invention to provide a measuring dispensing top for an aquarium fish food container that enables an accurate amount of fish food to be measured into and dispensed from the top without touching the food and is simple and inexpensive to manufacture.

SUMMARY OF THE INVENTION

According to the present invention, this and other objects are accomplished by a measuring dispensing top for an aquarium fish food container which includes a substantially planar base having a top side and a bottom side and having an opening defining an open portion and having a closed portion adjacent the open portion; a peripheral skirt depending from the bottom side of the base for attachment to the container; a peripheral side wall on the top side of the base and enclosing at least a part of the closed portion of the base and a part of the open portion of the base; a flip top pivotably mounted in the side wall and movable between a first closed position which cooperates with the closed portion and closes the container and a second open position which opens the container into the top; and a cover slidable in the side wall between a first closing position at which the cover together with the side wall and closed portion of the base and the flip top in its first closed position define a measuring chamber and at which the flip top can be moved to its second open position, and a second opening position at which the cover locks the flip top in its first closed position and opens the measuring chamber for dispensing of the container contents.

In a preferred embodiment of the present invention, the sliding cover is transparent and provides a visual control of the amount of food measured into the top and dispensed by the hobbyist.

BRIEF DESCRIPTION OF THE DRAWINGS

FIG. 1 is a top plan view of an embodiment of the measuring dispensing top for an aquarium fish food container of the present invention.

FIG. 2 is a sectional view of the measuring dispensing top for an aquarium fish food container of FIG. 1 showing the closed position of the flip top in solid lines and the open position of the flip top in broken lines.

FIG. 3 is a sectional view of the measuring dispensing top for an aquarium fish food container of FIG. 1 showing the cover of the measuring chamber in its open position.

DETAILED DESCRIPTION OF PREFERRED EMBODIMENTS

Figure 4A:
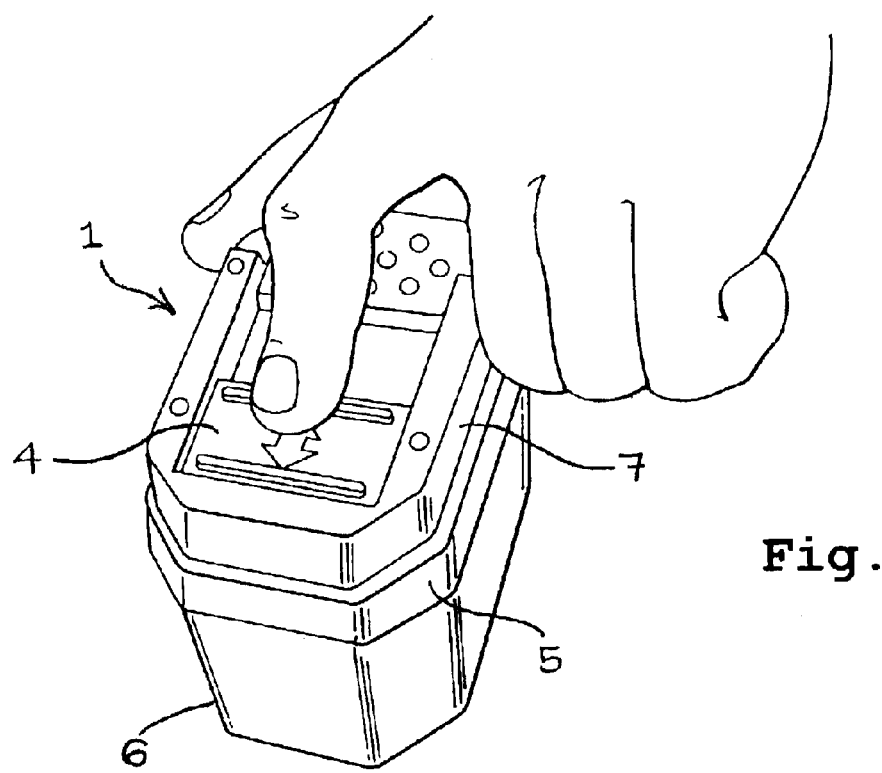
FIGS. 4A–4F are perspective views of the measuring dispensing top of FIG. 1 attached to an aquarium fish food container and illustrating the use of the top to measure fish food into the top and dispense it.

Referring now in detail to the drawings and, initially, to FIGS. 1 to 3, a preferred form of the measuring dispensing top for an aquarium fish food container of the present invention is generally indicated by reference numeral 1 and includes a base 1, a flip top 3 pivotable between an open position and a closed position, and a cover 4 which is slidable in the directions of the 10 arrows. As described in more detail below, in the position shown in FIG. 1 the cover covers a measuring chamber and allow the flip top to move to an open position which opens the container into the measuring chamber and allows fish food to be dispensed into the chamber. After the fish food has been dispensed into the measuring is chamber, the flip top is closed and the cover is slid to the right (in the direction of the arrow in FIG. 3) to lock the flip top in its closed position and to open the measuring chamber so that the fish food can be dispensed into the aquarium tank.

Referring, particularly, to FIGS. 2 and 3, a peripheral skirt 5 is provided on the bottom side of the base 2 for attaching to a container 6 (shown with a dot-dash line). A peripheral side wall 7 is provided on the top side of base 2 and extends around the front and sides of the top. As described below, the side wall 7 together with the cover 4 and a closed portion of the base 2 defines a closed measuring chamber 8 for the container contents.

Flip top 3 is pivotably mounted in the side wall 7 and covers an opening (generally indicated by the numeral 9 in the drawings) in base 2. Flip top 3 is pivotable in the side wall by means of, for example, hinge pins provided on the lateral sides of the flip top and opposed notches provided in the side walls. The flip top 3 pivots between a first closed position (shown by solid lines in FIG. 2) which closes the measuring chamber 8 and an second open position (shown by broken lines in FIG. 2) which opens the measuring chamber 8 and allows fish food to be dispensed therein from the container by shaking or the like.

Cover 4 is slidable in guide slots 10 provided in opposed surfaces of side wall 7 (refer to FIG. 3) between a first closing position shown in FIG. 2 in which the measuring chamber 8 is covered and flip top 3 can be moved to its open position (shown in broken lines in FIG. 2) (refer also to FIG. 4B) by pressing on lever end 3A of flip top 3. When flip top 3 is in its open position, an opening is formed in a side of measuring chamber 8 by cover 4, opposed surfaces of side wall 7 and base 2, and fish food can be dispensed into the measuring chamber 8 by tilting and shaking the container 6. After the fish food has been dispensed into measuring chamber 8, flip top 3 is moved to its closed position (shown in FIGS. 2 and 3) by pressing on forward end 3B of flip top 3, and then cover 4 is slid in the direction of the arrow in FIG. 3 to an opening position in which the cover 4 covers the forward end 3B of flip top 3 and locks flip top 3 in its closed position. As is apparent from the foregoing description, the guide slots 10 are provided in side wall 7 above the upper surface of forward end 3B of flip top 3 to allow cover 4 to be slid over the top of forward end 3B and thereby prevent flip top 3 from being moved to its open position during dispensing of the fish food from the top and into an aquarium tank.

In a preferred embodiment, cover 4 is transparent and provides a visual control on the amount of fish food dispensed into the measuring chamber.

Referring now to FIGS. 4A to 4F, the operation of the measuring dispensing top 1 of FIG. 1 to dispense a measured amount of fish food from a fish food container 6 will be described.

In a first step as shown in FIG. 4A, the cover 4 is slid to its first closing position above the measuring chamber where the top of the measuring chamber is closed.

Figure 4B:
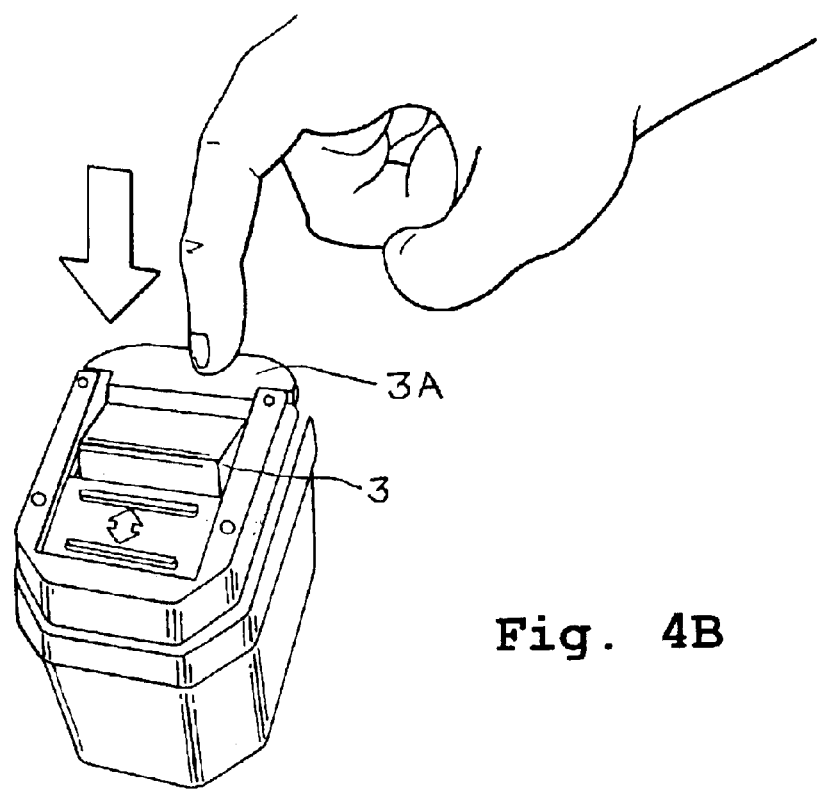

In a second step as shown in FIG. 4B, flip top 3 is pivoted to its open position (shown in broken lines in FIG. 2) by depressing on lever end 3A. Flip top 3 can be held in place in its open position, for example, by simple frictional engagement between surfaces of the side wall 7 and sides of the flip top 3, or by detents (not shown) provided on back surface 3C (refer to FIG. 2) of flip top 3 which engage the underside of a lip of base 2 and provide for a locking snap fit. When flip top 3 is in its open position container 6 opens into, measuring chamber 8 as shown in FIG. 2.

Figure 4C:
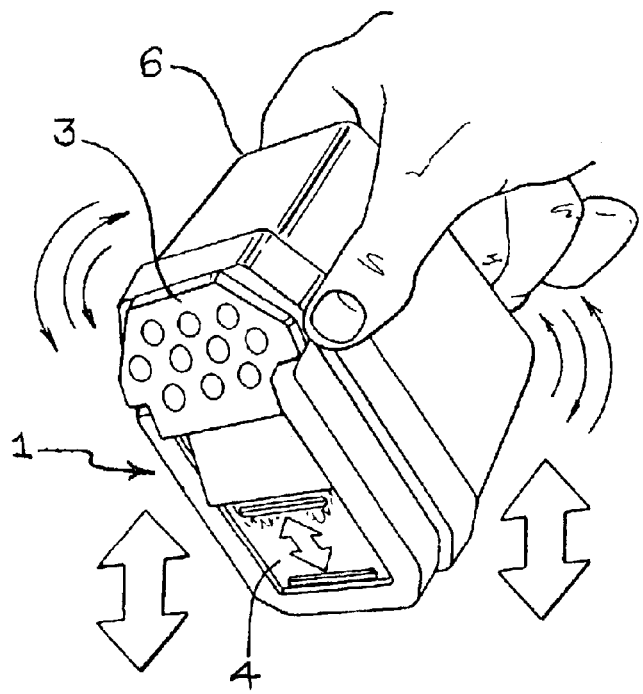

In a third step as shown in FIG. 4C, container 6 and top 1 are tipped to allow fish food to be shaken or poured into the measuring chamber 8. As explained above, cover 4 is preferably transparent so that the user is able to determine the presence or absence of fish food in the measuring chamber 8 and also is able to adjust the amount of fish food in that chamber by shaking more of the fish food into the measuring chamber 8 or shaking some of the fish food back into the container 6.

Figure 4D:
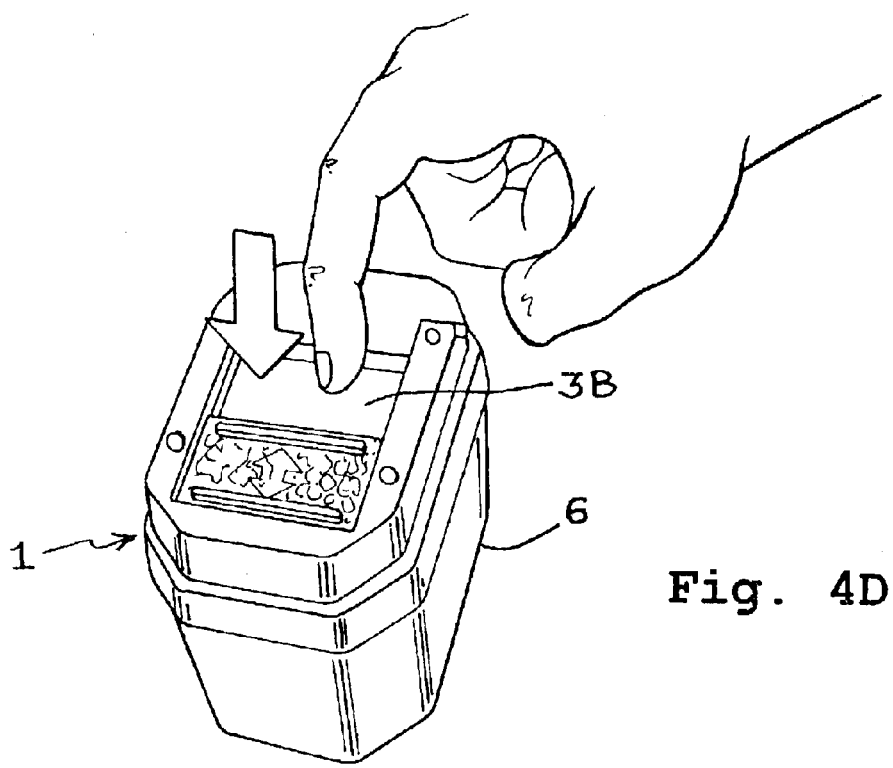

In a fourth step as shown in FIG. 4D, flip top 3 is pivoted to its closed position by depressing forward end 3B. In this position, measuring chamber 8 is completely closed.

Figure 4E:
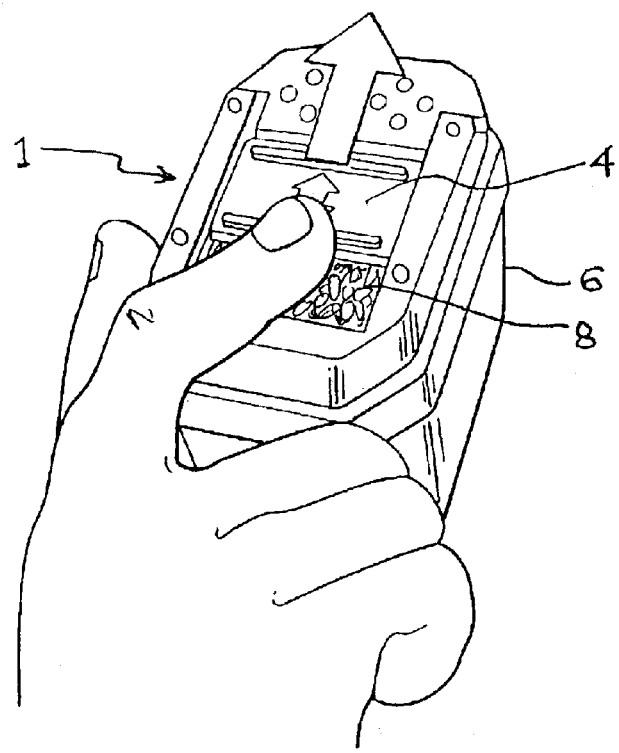

In a fifth step as shown in FIG. 4E, cover 4 is slid in the direction shown by the arrow to open the measuring chamber 8 and to cover the forward end 3B of the flip top 3. In this position, cover 4 locks the flip top 3 in its closed position closing the top to the interior of the container.

Figure 4F:
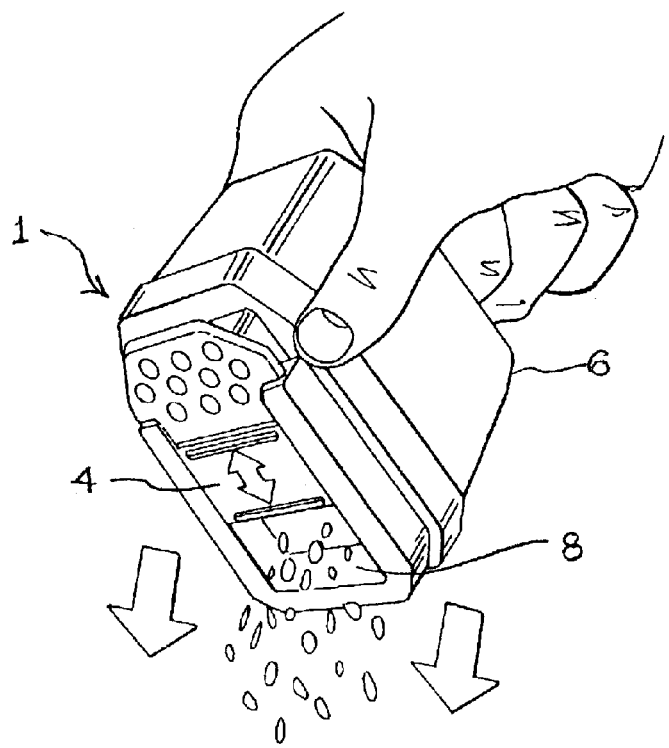

In a sixth step as shown in FIG. 4F, the fish food that has been measured into the measuring chamber 8 is dispensed into an aquarium tank by tipping the container 6 and measuring dispensing top 1. Since cover 4 is in a position at which flip top 3 is locked in its closed position closing the interior of the container, only the fish food that has been measured into the measuring chamber 8 is dispensed into the aquarium tank. Additionally, since the fish food is measured into the measuring chamber 8 when the measuring chamber is closed and since measuring chamber 8 is opened merely by sliding cover 4 to its opening position, touching of the fish food in order to dispense the food into an aquarium tank or the like is not necessary.

Although the measuring dispensing top of the invention has been described in conjunction with the dispensing of fish food into an aquarium tank from a fish food container, it is, of course, understood that the top can be used to dispense measured amounts of other solid foods such as spices, sugar, salt, etc. in particulate, granular or flake form from containers to which the top is attached.

It is also understood that although the embodiment of the measuring dispensing top of the present invention illustrated in the drawings of this application has a substantially rectangular base, the top could be provided on other bases such as a circular base for attachment to a cylindrical container or the like. Additionally, the measuring chamber and measuring chamber cover can have various shapes and sizes as long as the cover can be slid to a closing position where the measuring chamber is closed and can be slid to an opening position where the measuring chamber 8 is open and the flip top is locked in its closed position.

ADVANTAGES OF THE INVENTION

The measuring dispensing top of the present invention allows a measured amount of food to be dispensed from an aquarium fish food container into an aquarium without touching the food and finely controls the amount of food the hobbyist gives to the fish in the aquarium. The food cannot leak from the container by itself, and, in a preferred embodiment, the top is transparent and provides a visual control on the amount of food dispensed.

What is claimed is:

1. A measuring dispensing top for an aquarium fish food container comprising:

a substantially planar base having a top side and a bottom side and having an opening defining an open portion and having a closed portion adjacent the open portion;

a peripheral skirt depending from the bottom side of the base for attachment to the container;

a peripheral wall on the top side of the base and enclosing at least a part of the closed portion of the base and the open portion of the base;

a flip top pivotably mounted in said side wall and covering said open portion and pivotable between a first closed position in which the flip top engages said closed portion of the base and closes the container and a second open position which opens the container into the measuring dispensing top; and a cover slidable along the side wall between (1) a first closing position at which the cover together with the side wall and closed portion of the base and the flip top in its first closed position define a measuring chamber and at which first closing position the flip top is pivotable to its second open position, and (2) a second opening position at which the cover locks the flip top in its first closed position and opens the measuring chamber for dispensing.

2. The measuring dispensing top for an aquarium fish food container according to claim 1, wherein said cover is transparent.

3. An aquarium fish food container comprising a container having an open end and, attached to said open end, a measuring dispensing top comprising:

a substantially planar base having a top side and a bottom side and having an opening defining an open portion and having a closed portion adjacent the open portion;

a peripheral skirt depending from the bottom side of the base for attachment to the container;

a peripheral wall on the top side of the base and enclosing at least a part of the closed portion of the base and a part of the open portion of the base;

a flip top pivotably mounted in said side wall and covering said open portion and pivotable between a first closed position in which the flip top engages said closed portion of the base and closes the container and a second open position which opens the container into the measuring dispensing top; and a cover slidable along the side wall between (1) a first closing position at which the cover together with the side wall and closed portion of the base and the flip top in its first closed position define a measuring chamber and at which first closing position the flip top is pivotable to its second; open position, and (2) a second opening position at which the cover locks the flip top in its first closed position and opens the measuring chamber for dispensing.

* * * * *